United States Patent [19]
Enomoto et al.

[11] Patent Number: 5,321,571
[45] Date of Patent: Jun. 14, 1994

[54] TAPE CASSETTE WITH SLIDER COVER ROCKING MECHANISM HAVING COIL SPRING RETAINER PORTION

[75] Inventors: Haruomi Enomoto; Yasunori Suda; Yoshinobu Machida, all of Tochigi, Japan

[73] Assignee: Kao Corporation, Tokyo, Japan

[21] Appl. No.: 998,744

[22] Filed: Dec. 30, 1992

[30] Foreign Application Priority Data

Jan. 31, 1992 [JP] Japan ........................ 4-003383[U]

[51] Int. Cl.⁵ .............................................. G11B 23/02
[52] U.S. Cl. ................................................... 360/132
[58] Field of Search ....................... 360/132; 242/199

[56] References Cited

U.S. PATENT DOCUMENTS 4,881,137 11/1989 Meguro .................... 360/132
5,143,317 9/1922 Sugiyama ................. 360/132

Primary Examiner—A. J. Heinz
Attorney, Agent, or Firm—Birch, Stewart, Kolasch & Birch

[57] ABSTRACT

A tape cassette comprising a slider slidably covering a lower half of a cassette main body containing a magnetic tape, a lock element of the slider withdrawably inserted into the lower half surface, a locking coil spring for pressing the lock element, and a retainer portion for retaining the locking coil spring to an upper half, wherein:

the retainer portion comprises a spring receiving portion and a retainer wall surrounding the spring receiving portion, said retainer wall having a surface inclined toward the spring receiving portion.

5 Claims, 5 Drawing Sheets

TAPE CASSETTE WITH SLIDER COVER ROCKING MECHANISM HAVING COIL SPRING RETAINER PORTION

BACKGROUND OF THE INVENTION

1. Field of the Invention

The present invention relates to a tape cassette, and more particularly to a tape cassette in which no inferior assembling occurs.

2. Description of the Prior Art

Among tape cassettes, there is one which comprises a slider slidably covering the lower half of a cassette main body containing a magnetic tape, a lock element of the slider withdrawably inserted into the lower half surface, and a locking coil spring for pressing the lock element. The locking coil spring, as shown in FIGS. 8(a) and 8(b), is retained by a retainer portion 7 formed on an inner surface of an upper half 6, and the retainer portion 7 is formed of a knob member 90.

In the above tape cassette, however, inferior assembling tends to occur because of the following reason. For assembling, as shown in FIG. 8(b), since the locking coil spring 5 retained by the locking element (not shown) of the lower half is pushed hard against the knob member 90, the locking coil spring 5 is retained at angles by the lower half lock element, and if the inclination, as shown in FIG. 9, is more than the radius of the locking coil spring 5, the locking coil spring 5 is bent and not retained by the knob member 90 of the upper half 6.

Particularly, when the above tape cassette is automatically assembled, inferior assembling tends to occur because there is no means for correcting the inclination of the locking coil spring 5.

SUMMARY OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

It is therefore an object of the present invention to provide a tape cassette in which a locking coil spring to be mounted within a cassette when the cassette is being assembled is not bent and inferior assembling does not occur.

The present invention has achieved the above object by providing a tape cassette comprising a slider, slidably covering a lower half of a cassette main body containing a magnetic tape, a lock element for said slider withdrawably inserted into said lower half surface, a locking coil spring for pressing said lock element, and a retainer portion for retaining said locking coil spring to an upper half portion, wherein said retainer portion comprises a spring receiving portion, and a retainer wall surrounding said spring receiving portion and having a surface inclined toward said spring receiving portion.

According to the tape cassette of the present invention, even if the locking coil spring is obliquely retained by the lock element when the cassette is being assembled, the locking coil spring is guided by the inclined surface of the retainer wall of the retainer portion and retained by the spring receiving portion.

As a consequence, in the tape cassette of the present invention, the locking coil spring to be mounted within the cassette when the cassette is being assembled is not bent and inferior assembling does not occur.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE EMBODIMENT

One embodiment of a tape cassette of the present invention will now be described with reference to the drawings.

Figure 1:
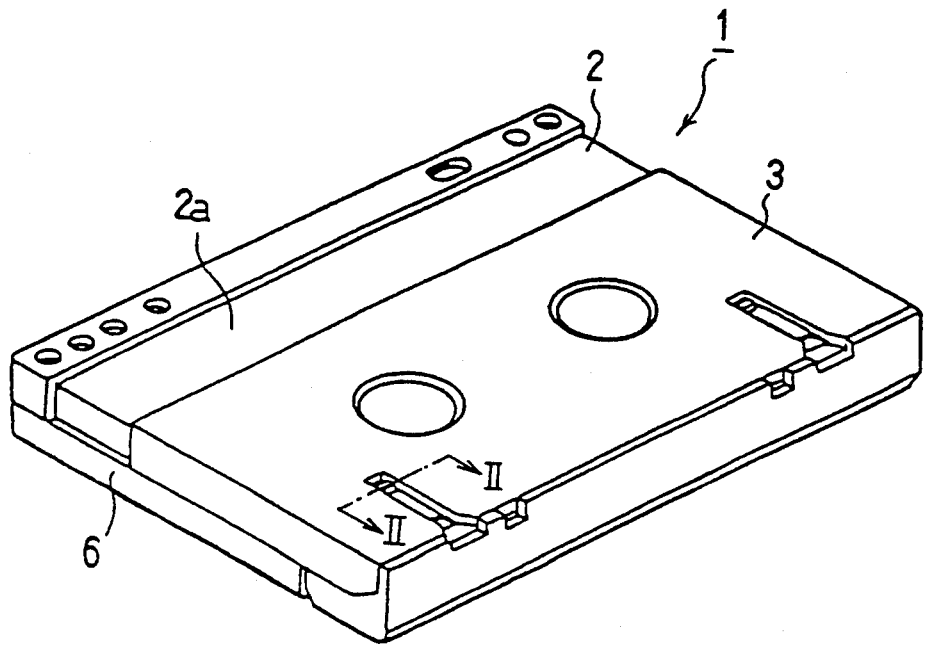
FIG. 1 is a perspective view of a tape cassette according to one embodiment of the present invention.
Figure 2:
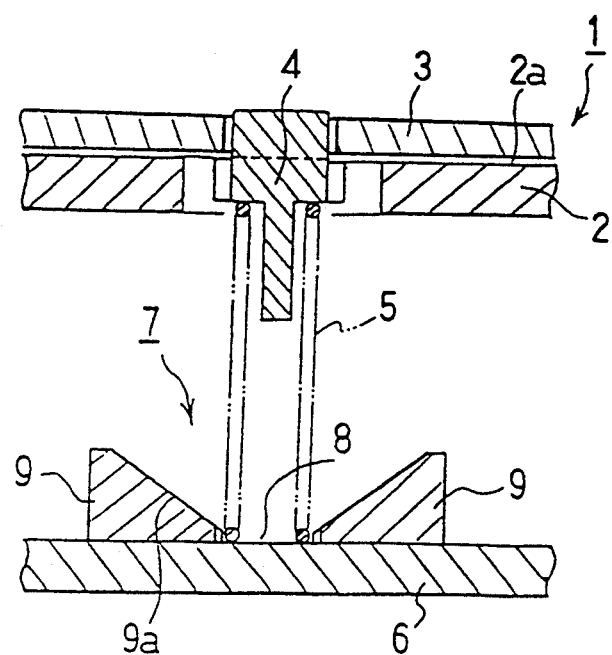
FIG. 2 is a sectional view taken on line II—II of FIG. 1.
Figure 3:
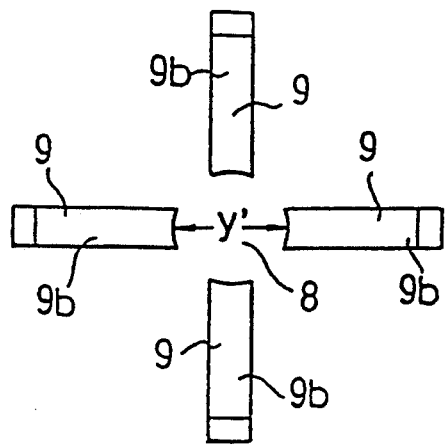
FIG. 3(a) is a plan view showing a retainer portion of the embodiment shown in FIG. 1.
FIG. 3(b) is a perspective view of a part of FIG. 3(a)
FIG. 3(c) is a sectional view showing a locking coil spring fully inserted into the retainer portion.
Figure 3:
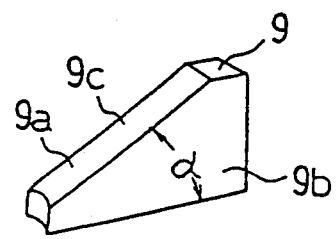
Figure 3:
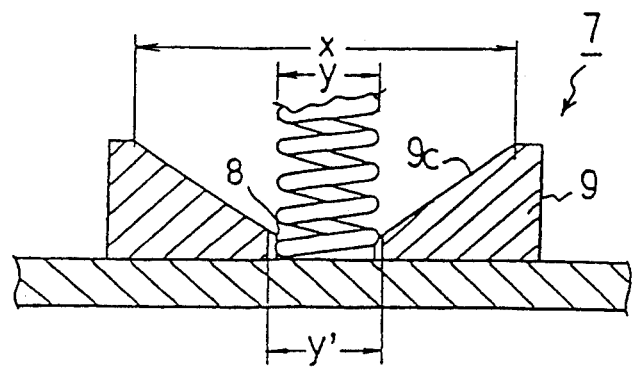
Figure 4:
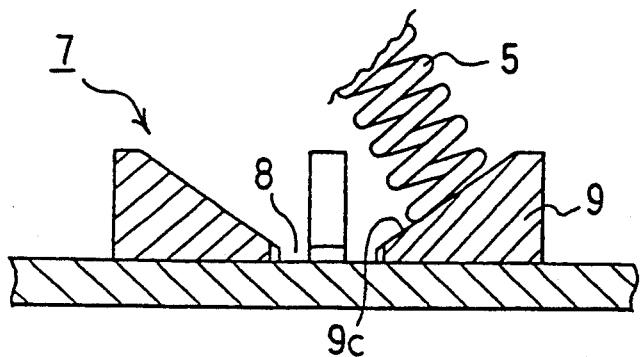
FIG. 4 is a sectional view showing one state when the locking coil spring is inserted into the retainer portion of the embodiment shown in FIG. 1.

FIGS. 1 through 4 show one embodiment of a tape cassette of the present invention, FIG. 1 is a perspective view of the tape cassette, FIG. 2 is a sectional view taken on line II—II of FIG. 1, FIG. 3(a) is a plan view showing a retainer portion of the embodiment shown in FIG. 1, FIG. 3(b) is a perspective view of a part of FIG. 3(a), FIG. 3(c) is a sectional view showing a locking coil spring fully inserted into the retainer portion, and FIG. 4 is a sectional view showing one state when the locking coil spring is inserted into the retainer portion of the embodiment shown in FIG. 1.

The tape cassette of this embodiment comprises, as shown in FIGS. 1 and 2, a slider 3 slidably covering a lower half 2 of a cassette main body 1 containing a magnetic tape (not shown), a lock element 4 of the slider 3 withdrawably inserted into the lower half surface 2a, a locking coil spring 5 for pressing the lock element 4, and a retainer portion 7 for retaining the locking coil spring 5 to an upper half 6.

In the tape cassette of this embodiment, as shown in FIG. 2, the retainer portion 7 comprises a spring receiving portion 8, and a retainer wall 9 surrounding the spring receiving portion 8 and having a surface 9a inclined toward the spring receiving portion 8.

The retainer portion 7 of this embodiment will be described in more detail. As shown in FIGS. 3(a) and 3(b), the retainer wall 9 comprises four knob members 9b each having an inclination surface 9c and arranged generally in a pattern of a cross with the inclination surfaces 9c inclined toward the spring receiving portion 8.

In the spring receiving portion 8, as shown in FIGS. 3(a) and 3(c), an inner diameter y' of the spring receiving portion 8 is slightly longer than an outer diameter y of the locking coil spring 5 so that the locking coil spring 5 can easily be received in the spring receiving portion 8.

Furthermore, the length X between upper ends of a pair of the opposing inclination surfaces 9c, 9c, as shown in FIG. 3(c), is long enough with respect to the outer diameter y of the locking coil spring 5 such that x>y is satisfied, so that the locking coil spring 5 will not escape outside of the retainer portion 7 when the cassette is being assembled.

The inclination α of each inclination surface 9c is preferably in a range of from 30° to 60°. The length x can be defined as a distance between the upper end portions of the inclination surfaces passing the center of the receiving portion.

In the tape cassette of this embodiment thus constructed, even if the locking coil spring 5 is obliquely retained by the lock element 4 when the cassette is being assembled, the locking coil spring 5, as shown in FIG. 4, is guided by the inclination surface 9c of the retainer wall 9 and slipped into and retained by the spring receiving portion 8 of the retainer portion 7. As a consequence, the locking coil spring 5 is not bent and inferior assembling does not occur.

Figure 5A:
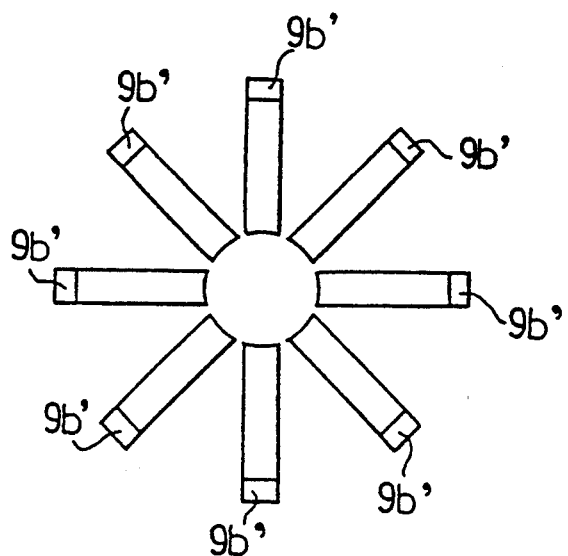
FIG. 5(a) is a plan view showing the retainer portion of the embodiment.
Figure 5B:
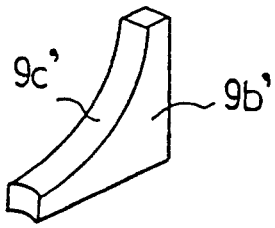
FIG. 5(b) is a perspective view thereof.
Figure 5C:
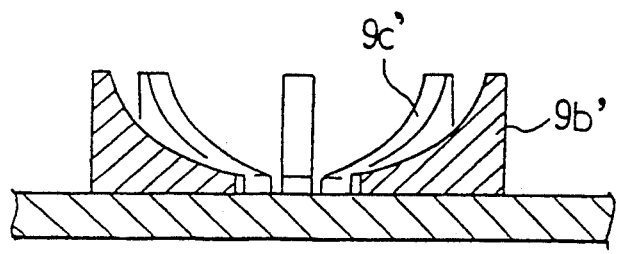
FIG. 5(c) is a sectional view thereof.

In the above embodiment, four knob members 9b are provided, and the inclination surface 9c of the retainer wall 9 is planar. Alternatively, however, as shown in FIGS. 5(a), 5(b) and 5(c), eight knob members 9b' may be provided, and the inclination surface 9c' may be curved. In this modified embodiment, the same effect as in the tape cassette of the above embodiment can be obtained.

Figure 6A:
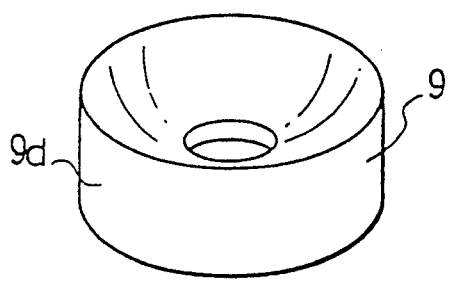
FIG. 6(a) is a perspective view showing a retainer portion according to another embodiment of the present invention.
Figure 6B:
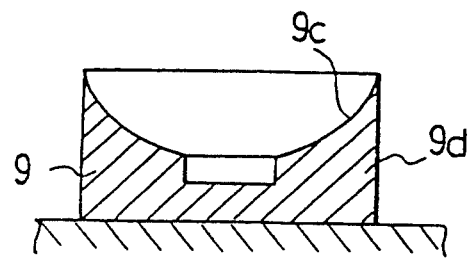
FIG. 6(b) is a sectional view thereof.

FIG. 6(a) is a perspective view showing a retainer portion according to another embodiment of the present invention, and FIG. 6(b) is a sectional view thereof. In this embodiment, the retainer wall 9 is formed of a cylindrical annular knob member 9d and its inclination surface is curved. All other parts of the construction are the same as the embodiment shown in FIGS. 1 through 5.

Figure 7A:
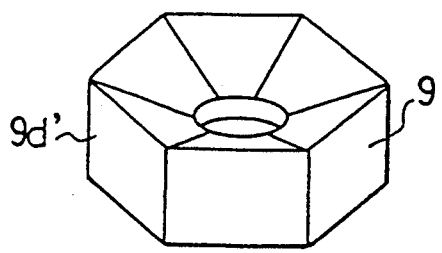
FIG. 7(a) is a perspective view of the retainer portion of the embodiment.
Figure 7B:
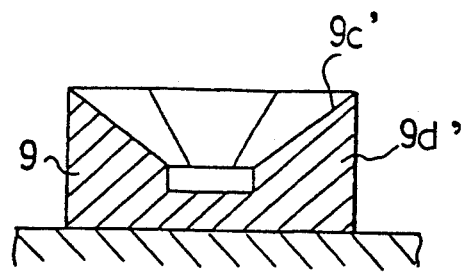
FIG. 7(b) is a sectional view thereof.
Figure 8A:
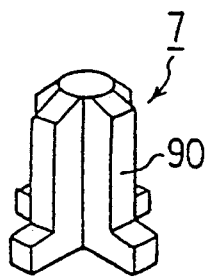
FIG. 8(a) is a perspective view showing a retainer portion in a conventional tape cassette.
Figure 8B:
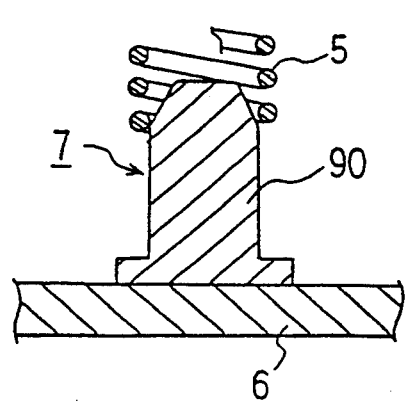
FIG. 8(b) is a sectional view thereof.
Figure 9:
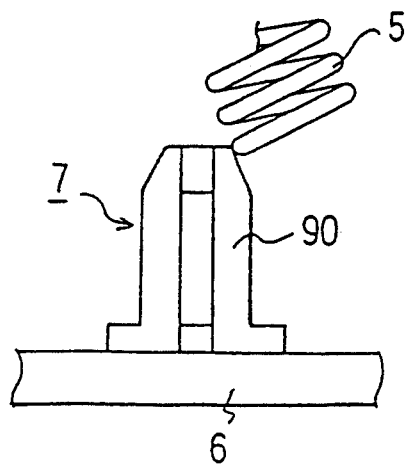
FIG. 9 is a side view when a locking coil spring is attached to the retainer portion of a conventional tape cassette.

In the above second mentioned embodiment, the knob member 9d has a cylindrical annular configuration and the inclination surface 9c is curved. Alternatively, however, the knob member 9d', as shown in FIGS. 7(a) and 7(b), may have a hexagonal annular configuration and the inclination surface 9c' may be formed of six continuous planes.

In these modified embodiments, the same effect as the tape cassette of the previously mentioned embodiment can be obtained.

The configuration of the retainer portion of the tape cassette of the present invention is not limited to the above embodiments. For example, in the case where knob members are radially arranged at generally equal spaces, it suffices if the number of the knob members is three or more. In the case where the retainer portion is formed of an annular knob member, the configuration of the knob member is not limited to a circular cylinder and a prism. Moreover, the configuration of the retainer portion may be something like the above annular knob member, properly cut.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tape cassette main body adapted to retain a magnetic tape which comprises:

an upper half portion and a lower half portion, a slider member slidably covering the lower half portion, said slider member and said lower half portion being provided with aligning apertures therein, a lock element for said slider member extending through said apertures and withdrawably disposed within said lower half portion, a locking coil spring operatively engaging said lock element, and a retainer portion attached to said upper half portion for retaining said locking coil spring to said upper half portion, said retainer portion comprising a retainer wall surrounding a surface portion of the upper half portion to define a spring receiving portion, said retaining wall having a surface which declines toward said spring receiving portion.

2. The tape cassette of claim 1 wherein the retainer wall comprises a plurality of radially disposed and equally spaced-apart declining surfaces.

3. The tape cassette of claim 2 wherein the retainer wall comprises at least three radially disposed and equally spaced-apart declining surfaces.

4. The tape cassette of claim 1 wherein the surface of said retaining wall is inclined at an angle of 30°-60°.

5. The tape cassette of claim 1 wherein the retainer wall has a semi-spherical configuration.

* * * * *